O. C. RITZ WOLLER.
WINDOW CLEANER.
APPLICATION FILED APR. 8, 1918.
1,363,490.
Patented Dec. 28, 1920.
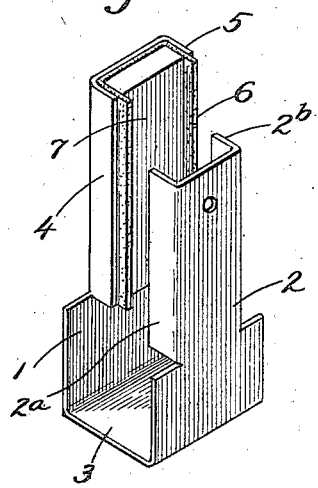
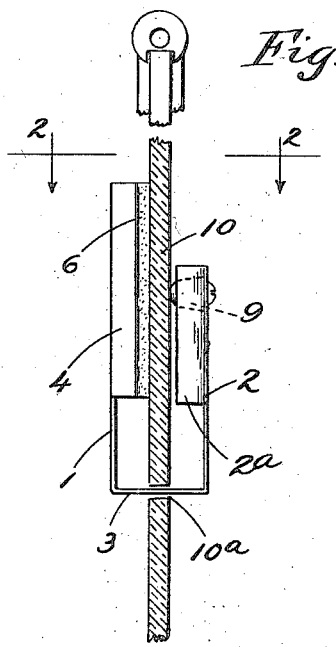
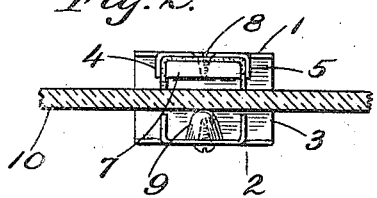
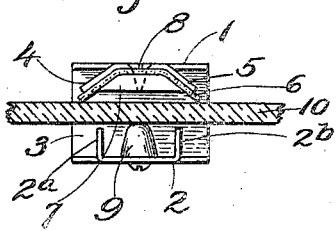
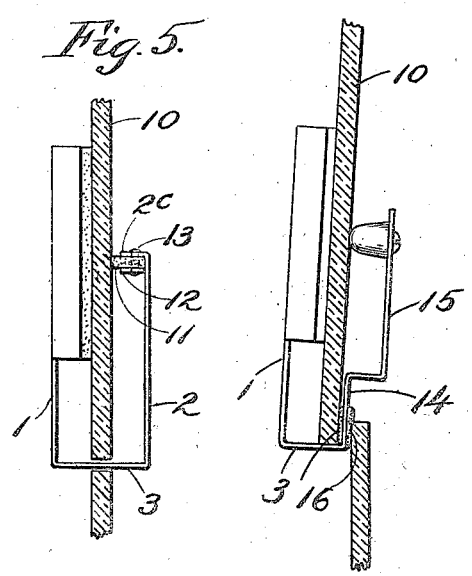
Witness:
C. C. Burnap
Inventor:
Oliver C. Ritz Woller
By Sheridan, Jones, Sheridan & Smith, Att'ys

UNITED STATES PATENT OFFICE.

OLIVER C. RITZ WOLLER, OF CHICAGO, ILLINOIS.

WINDOW-CLEANER.

1,363,490.        Specification of Letters Patent.        Patented Dec. 28, 1920.

Application filed April 3, 1918. Serial No. 227,401.

*To all whom it may concern:*

Be it known that I, OLIVER C. RITZ WOLLER, a citizen of the United States, residing at Chicago, in the county of Cook and State of Illinois, have invented certain new and useful Improvements in Window-Cleaners, of which the following is a specification.

This invention relates to improvements in window cleaners and more particularly to devices of this type which are adapted for use in connection with automobile windshields, car windows and the like.

Among the objects of the invention are to provide a cleaner of this character which may be mounted on a windshield without boring a hole therein or otherwise altering the same; to provide a cleaner which is self-supporting when once placed in position, and one which may be mounted over either the upper or lower edge of the upper section of a windshield of the so-called clear vision type without interfering with the manipulation of said upper section when it is desired to move the same into any one of its various positions of angular adjustment.

Other objects and advantages will be apparent from the following description taken in connection with the accompanying drawings wherein several embodiments of the invention are illustrated.

Figure 1 is a perspective view of the cleaner.

Fig. 2 is a sectional view taken on line 2—2 of Fig. 3.

Fig. 3 is a sectional view taken through a windshield showing the cleaner mounted thereon in elevation, and, Figs. 4, 5 and 6 illustrate slightly modified forms of the invention.

Referring more in detail to the drawings, the cleaner comprises preferably a piece of resilient plate metal bent intermediate it ends to provide a wiper arm 1, a handle 2 and a connecting member 3. Struck up from the wiper arm 1 to form a suitable channel are a plurality of flanges 4 and 5, suitable wiping material 6 preferably of rubber or felt being clamped securely within said channel by means of a suitable block or wedge 7, which may be held in place by any desired means, shown in the drawings in the form of headed fasteners 8 which extend through the rear wall of the channel and into the block or wedge 7, substantially as shown in Fig. 2 of the drawings. The longitudinal edges of the rubber or felt wiping material project slightly beyond the outer edges of the flanges 4 and 5 and the outer surface of the block 7 whereby the same may contact with the surface of the glass substantially as shown. The free end of the handle 2 is preferably provided with a wooden or rubber buffer 9 secured thereto in any suitable manner and designed to bear against the inner surface of the glass to thereby maintain the handle in spaced relation thereto, as shown more clearly in Fig. 3. It is also preferred to provide the handle with inwardly directed flanges $2^a$ and $2^b$ similar to the flanges 4 and 5 of the wiper arm, so that a firm grip may be had when it is desired to manipulate the device.

As previously set out, the cleaner herein described is designed more particularly for application to the lower edge of the upper pivoted section 10 of a windshield of the so-called clear vision type. In Fig. 3, the application of the cleaner to a windshield of this type is illustrated, the connecting member 3 of the cleaner being designed to pass through the opening $10^a$ between the adjacent edges of the upper and lower sections of said windshield, said cleaner being of such construction as not to interfere with the manipulation of the upper pivoted section. It is preferred to make the cleaner sufficiently resilient in order that it may be self-supporting when once placed in position, the same being designed to be slid back and forth over the glass when it is desired to clean the same.

In Fig. 4 a slightly modified form of wiper arm is illustrated. In this form of the invention, the flanges 4 and 5, instead of being bent at substantially right angles to the wiper arm 1, as shown in the preferred form of the invention, are preferably disposed at an angle thereto less than a right angle so that when the rubber or felt wiping material 6 is clamped within the channel formed by the flanges 4 and 5, the projecting edges of said wiping material will also be disposed at an angle to the wiper arm 1 and to the glass with which they are designed to contact. In this manner, a cleaner is provided, the wiping element of which has more or less of a scraping effect, which may be found more desirable under certain conditions than the right angle contact disclosed in the preferred form of the invention. For obvious reasons in this form of the invention, the sides of the block 7 are also inclined substantially as shown.

In Fig. 5 a modified form of buffer provided at the end of the handle 2 is illustrated. In this form the outer end of the handle 2 is bent over as at $2^c$ and a suitable piece of rubber or belt 11 is clamped between said bent-over portion $2^c$ and a suitable retaining strip 12 by means of rivets or other suitable fasteners 13.

As is well known in a large number of the so-called clear vision windshields now in use the upper pivoted section 10 overlaps the lower section when said sections are in their vertical positions, substantially as shown in Fig. 6. In this figure, therefore, is shown a slightly modified form of cleaner which may be used in connection with windshields of this type, the part of the cleaner which is disposed adjacent the inner face of the windshield being provided with a plurality of offset portions 14 and 15, the offset portion 15 serving, as will be noted, as the handle. The portion 14 is designed to lie flat against the inner surface of the upper section of the shield as shown, so as to permit the upper and lower sections being moved into overlapping contact, the opposite surfaces of said portion 14 being provided with felt or other suitable cushioning material 16 as protection for the edges of the glass when the same are moved together. In other respects the cleaner shown in this figure of the drawing is substantially the same as that illustrated in Fig. 1 with the further exception that the gripping flanges $2^a$ and $2^b$ are omitted. It is, of course, obvious that these flanges may be provided or omitted, as desired, in any of the forms illustrated.

While the cleaner herein illustrated and described has been designed particularly for application to the lower edge of the upper section of a clear vision windshield, it is, of course, obvious that it is not limited in its use to such application, but may be placed in position over the upper edge of the windshield, if desired, in which position the wiper arm would project downwardly over the glass rather than upwardly thereover. The manner of positioning and operating the cleaner, however, is the same in either case.

Furthermore, it being apparent that the structure herein illustrated and described is susceptible to many changes and modifications, it is not intended to restrict the invention to the particular construction or combination of parts herein set forth except where limitations appear in the appended claim.

Having thus described my invention, what I claim as new and desire to secure by Letters Patent of the United States is:—

A windshield cleaner comprising a single piece of resilient metal bent intermediate its ends to provide a wiper arm and a handle, a plurality of flanges struck up from said wiper arm to form a channel, a block fitting within said channel, a piece of wiping material clamped between said block and the walls of said channel, the edges of said material projecting beyond the edges of said flanges and adapted to bear against the surface to be cleaned, a plurality of flanges struck up from said handle and directed toward said wiper arm to provide gripping means on said handle for manipulating the cleaner, and a spacing element carried by said handle between said flanges designed when said cleaner is in operative position to retain said handle out of frictional engagement with the surface over which said cleaner is manipulated.

In testimony whereof I have subscribed my name.

OLIVER C. RITZ WOLLER.